United States Patent Office 3,366,595
Patented Jan. 30, 1968

3,366,595
RESINOUS COMPOSITIONS FROM ALKYL GLYCIDYL ETHERS AND FURFURYL ALCOHOL-CYCLIC OLEFIN COPOLYMERS AND THEIR USE AS EPOXY RESIN DILUENTS
John E. Dereich, Pittsburgh, Pa., assignor to Neville Chemical Company, Pittsburgh, Pa., a corporation of Pennsylvania
No Drawing. Filed Mar. 4, 1965, Ser. No. 437,296
17 Claims. (Cl. 260—33.6)

This invention relates to new oxygen-containing resin compositions, to a process for making them and to their use as modifiers or extenders for more costly resins, particularly for epoxy resins. More specifically, the invention relates to compositions which comprise a copolymer of furfuryl alcohol with an ethylenically unsaturated hydrocarbon copolymerizable therewith, or with a petroleum fraction containing a mixture of such unsaturated hydrocarbons, said copolymer being blended with an alkyl glycidyl ether.

Epoxy resins are well known for their superior resistance to most solvents, excellent dielectric properties and generally excellent physical properties of all kinds. As they can be readily cured in a variety of curing systems they have been increasingly employed in a variety of high grade uses, such as in the special coating field, as potting compounds for electrical components, in molding glass fiber reinforced plastic articles and so on. However, their relatively high cost and the difficulty of extending them with less costly materials without seriously impairing their more desirable characteristics have kept the epoxy resins out of many applications that would otherwise be open to them.

It is thus an object of this invention to provide an improved resin composition suitable for extending or modifying epoxy resins, and desirably also a variety of other resinous materials. Another object is to provide an extender for epoxy resins which has little or no adverse effect on their pot life, their curability at room temperature if desired, their heat distortion temperature, their electrical properties, their chemical resistance, etc. A more specific object is to make an oxygen-containing resin composition compatible with epoxy resins by copolymerizing a relatively inexpensive hydrocarbon feed, such as a cracked petroleum hydrocarbon fraction, with furfuryl alcohol and suitably modifying the resulting copolymer, as with an alkyl glycidyl ether, to impart to it the desired combination of properties.

In pursuit of the above objects a novel, economical resinous composition has now been discovered which is surprisingly effective as an extender or modifier for epoxy resins, as well as being compatible with a wide variety of other materials such as alkyd resins, the oil soluble type of phenol-formaldehyde resins, urea-formaldehyde resins, methyl methacrylate resins, rosin, chlorinated paraffins, dicarboxylic acids, alkyl ester plasticizers, coumarone-indene resins, polyethylene and so forth. More specifically, it has been discovered that the objects stated above can be achieved in a surprisingly effective manner by blending between about 5 and 40%, preferably 7 to 25%, of an alkyl glycidyl ether having the formula

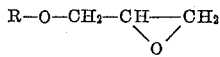

wherein R is an alkyl radical of about 4 to 18 carbon atoms, preferably a straight chain alkyl radical of 8 to about 16 carbon atoms, with an already formed furfuryl alcohol copolymer of the type described in copending application, Ser. No. 282,155, filed May 21, 1963. Dodecyl glycidyl ether or an alkyl glycidyl ether wherein the average alkyl group is about $C_{14}$ are particularly preferred modifying agents but other related compounds such as n-butyl glycidyl ether, n-amyl glycidyl ether, or n-octadecyl glycidyl ether, or mixtures of such ethers, are also useful. Phenyl glycidyl ether can also be used.

A useful extender for epoxy resin can also be formed by including the glycidyl ether with the furfuryl alcohol and the olefinic hydrocarbon as part of the charge used in making the furfuryl alcohol copolymer. However, in such a case the resulting resin has a relatively high proportion of ether linkages and a relatively low hydroxyl number and is therefore less desirable for many uses than the preferred products made by modifying a separately formed furfuryl alcohol copolymer by subsequent addition of the alkyl glycidyl ether.

These preferred glycidyl ether modified copolymer compositions have a molecular weight between about 400 and 1500 (number average) and relatively high hydroxyl numbers, e.g., between about 50 and 150 (as tested upon hydrolysis of the epoxide groups present). When blended with epoxy resins and cast or otherwise applied as thin coatings or layers they can be used to give flexible films upon curing and can themselves be cured together with linseed oil to give a flexible product. They are compatible in all proportions with liquid or solid uncured epoxy resins (glycidyl polyether resins). Particularly useful products are obtained by blending from about 5 to 200 parts, preferably between about 10 and 100 parts, of the novel alkyl glycidyl ether modified copolymer composition per 100 parts of an epoxy resin made by condensing a bisphenol such as bisphenol A with an excess of epichlorhydrin, e.g., an epoxy resin having an epoxide equivalent between about 140 and 4000, preferably between about 150 and 1000.

As described in said earlier copending application, Ser. No. 282,155, now U.S. Patent 3,301,918, to which reference may be had for further details, a useful resinous copolymer can be formed by thermal copolymerization of furfuryl alcohol with a mono- or bicyclic olefin, diolefin, or with a diolefin such as dicyclopentadiene, methylcyclopentadiene dimer, codimer of cyclopentadiene and methylcyclopentadiene, or with aromatic hydrocarbons that can be copolymerized with furfuryl alcohol, e.g., indene, methyl-indene, vinyl toluene, styrene and the like. In such copolymerization the various unsaturated hydrocarbons may be used individually, in essentially pure form, or as hydrocarbon mixtures. Particularly useful resins have been obtained by thermally copolymerizing a severely cracked petroleum fraction boiling in the heavy naphtha or light gas oil boiling range, e.g., between about 110° and 350° C., with a minor proportion of furfuryl alcohol, i.e., from a feed which may contain 10 parts of furfuryl alcohol in admixture with about 15 to 100 parts, preferably 30 to 50 parts of a cracked petroleum fraction containing between about 65 and 95 precent of polymerizable unsaturated $C_7$–$C_{14}$ hydrocarbons, especially $C_8$–$C_{12}$ hydrocarbons. This polymerization can be effected by heating the polymerizable feed mixture between about 150° and 250° C., preferably between about 200° and 230° C., until the desired conversion is obtained. For instance, a conversion of about 50 to 90% based on total hydrocarbon and furfuryl alcohol charged is representative of a practical operation. Furfuryl alcohol conversion may be between about 80 and 95%. The resulting copolymer may accordingly contain about 15 to 60%, e.g. 25 to 37%, of combined furfuryl alcohol and correspondingly about 85 to 40%, e.g., 75 to 63%, of combined hydrocarbon.

Unsaturated hydrocarbon fractions suitable for such copolymerization with furfuryl alcohol can be obtained from a variety of processes, for instance, from steam cracking of gas oil, from thermal cracking of gas oil or of naphtha or ethane-propane mixtures or similar normally gaseous hydrocarbon feeds. Particularly useful are cracked feed fractions which boil predominantly between about 140° and 275° C., i.e., cracked petroleum fractions which have less than about 10% of material boiling above and less than about 10% of material boiling below the stated range. The specific gravity of such unsaturated feed fractions (15.6°/15.6° C.) usually is between about 0.89 and 0.985, and its iodine number is usually between about 135 and 190. Particularly desirable unsaturated hydrocarbon fractions are obtained by thermal cracking of 50/50 mixtures of ethane and propane, such fractions being characterized by having a boiling range such that at least 95% of the fraction boils above 140° C. and below 250° C., a specific gravity between about 0.96 and 0.975, an iodine number between about 160 and 170 and a mixed aniline point between about 50 and 60° C.

Typically, such fractions contain from about 35% to about 90%, preferably from about 40 to 60%, of polymerizable $C_8$–$C_{12}$ or especially $C_8$–$C_{10}$ unsaturated hydrocarbons such as dicyclopentadiene, dimethylcyclopentadiene, codimer of cyclopentadiene and methylcyclopentadiene, indene, methyl-indene, styrene and vinyl toluene. The balance of said fractions is constituted of essentially unpolymerizable paraffins, naphthenes and aromatics boiling within the stated range, especially alkyl benzenes, naphthalene and methyl naphthalenes. When such a fraction contains more than about 60% of polymerizable hydrocarbons it is often advantageous to dilute it with a substantially unpolymerizable diluent prior to polymerization so as to moderate the otherwise considerable rate of reaction. Such feeds copolymerize with furfuryl alcohol quite readily upon heating, and for the purposes of the present invention are suitably copolymerized in the absence of any added catalyst.

Upon completion of the polymerization step, unpolymerized material is removed from the mixture by steam stripping or equivalent means until a resin possessing the desired softening point, e.g., a Ring and Ball softening point (ASTM E-28) between 100° and 175° C., preferably 120° to 150° C., is obtained. When a light colored product is desired it is advisable to keep the resin temperature below 240° C. For this reason it is often advantageous to strip with steam or under reduced pressure, or to resort to a combination of such expedients.

When the copolymer resin has been stripped to the desired extent it is then cut back with a minor proportion of an appropriate alkyl glycidyl ether, e.g., with 5 to 70 percent of a $C_{14}$ alkyl glycidyl ether. Addition of between about 5 and 15 parts of the alkyl glycidyl ether per 100 parts of the copolymer resin produces a solid product having a Ring and Ball softening point between about 90° and 130° C., preferably between 115° and 125° C., and a hydroxyl number between about 70 and 150, preferably between 90 and 115. The resulting solid product can be readily converted to a convenient flake form by conventional flaking techniques. The flaked resin can then be used for extending epoxy resins. The novel material in this form has little effect on structural strength of epoxy resins and is particularly useful where high temperature cures are employed and where high distortion temperatures are needed. However, where a liquid extender is preferred or where low temperature cure, low exotherm (i.e., no sudden rise in temperature when the eventual resin blend is cured into castings, etc.) and good flexibility, resiliency and toughness are prime factors, a greater proportion of glycidyl ether, e.g., as much as 50 to 70 parts per 100 parts of copolymer, may be included. The heat shock occurring in a high exotherm system can also be further moderated by including a metal powder such as aluminum or copper in the resin blend.

When preparing a solid reactive extender composition of the type described above it is generally desirable to strip the crude copolymer resin to a Ring and Ball softening point of not less than about 150° C. before the copolymer resin is cut back with the alkyl glycidyl ether. On the other hand, when a liquid extender is desired and complete reactivity with epoxy resins not required the crude copolymer may under some conditions not have to be stripped at all, or it may be stripped only enough to raise its softening point to about 120° C., and then further cut back with as much as 50 to 70 parts (per 100 parts copolymer) of the alkyl glycidyl epoxide.

As a further alternate an epoxide containing liquid extender can also be made from a high melting copolymer of furfuryl alcohol and unsaturated hydrocarbon by cutting it back to the desired extent as a hot melt with say about 5 to 20 parts of an appropriate high boiling hydrocarbon oil either simultaneously with, before, or after addition of the alkyl glycidyl thereto. To give good results with epoxy resins, the hydrocarbon oil used to cut back the extender resin should have good solvency for epoxy resins, e.g., a Kauri Butanol value (ASTM D 1133–50T) greater than about 95 cc., a mixed aniline point (ASTM D 1012–49T) of about 15° to 20° C. or less, contain at least 75% and preferably at least 90% aromatics by volume, and have an initial boiling point of at least 350° F., preferably greater than 400° F., such as to boil, for instance, in the range between about 400° and 560° F. Typically, the viscosity of such an oil should be in the order of magnitude of about 5 centipoises at 25° C.

The nature, mode of operation and utility of the invention, though not its limits, are further illustrated by the following examples. In these examples, as well as in the rest of this specification and the claims, all amounts and proportions of materials are expressed on a weight basis unless otherwise indicated.

*Example 1*

A composition containing reactive hydroxyl groups is prepared in accordance with the present invention using an unsaturated petroleum hydrocarbon fraction obtained by thermal cracking of an ethane-propane mixture, furfuryl alcohol and a $C_{14}$ (average) alkyl glycidyl ether. All of these are commercially available materials having the properties set forth below.

Unsaturated hydrocarbon feed fraction:
   Specific gravity at 15.6° C. _____ 0.965
   Engler distillation
      5% off, ° C. _____ 150
      95% off, ° C. _____ 215
   Polymerizable hydrocarbon content, percent _____ About 75
   Color, Gardner _____ 6
   Iodine number _____ About 165

Furfuryl alcohol:
   Specific gravity at 15.6° C. _____ 1.140
   Color, Gardner _____ 4
   Hydroxyl number _____ 550
   Percent moisture (ASTM D–95), max. _____ 0.3

C₁₂–C₁₆ alkyl glycidyl ether ("Epoxide No. 44," manufactured by Procter & Gamble Company, Cincinnati, Ohio):

| | |
|---|---|
| Oxirane oxygen, percent | 5.2 |
| Specific gravity at 30° C. | 0.880 |
| R.I. $n_D^{25}$ | 1.4475 |
| Color, Saybolt, min. | +10 |
| Boiling range, ° C. at 100 mm. Hg | 150–310 |
| Flash point, C.O.C., ° F. | 275 |
| Average number of carbon atoms per alkyl group | 14 |
| Hydroxyl number | 250 |

80 parts of the above described unsaturated hydrocarbon fraction and twenty parts of the furfuryl alcohol are charged to a still which has been carefully dried to remove moisture therefrom. The feed materials themselves should also be dry enough to give a clear, transparent mixture. Cloudiness of the charge is usually indicative of a moisture content which may result in some impairment of ultimate product quality. Maintenance of the reaction mixture under substantially anhydrous conditions is helpful in assuring a good product. Presence of moisture in the feed is also reflected in higher than usual reaction pressures.

The still containing this reaction mixture is closed off and gradually heated to about 220° C. over a period of about 6 hours. The rate of heating is kept low enough to keep the exotherm from getting out of control and is readily determined by preliminary empirical tests. It depends, of course, on the size of the batch, the specific raw materials used, the characteristics of the equipment, etc. The pressure normally does not exceed 100 p.s.i.g. and is preferably maintained below about 80 p.s.i.g. by proper heat control.

The temperature of the reaction mixture is held at 220° C. for about 16 to 30 hours, i.e., until a copolymer resin of the desired hydroxyl number and molecular weight (e.g., about 800) is obtained. The yield of resin may range between about 50 and 95% based on total charge, e.g., 77%. The still is thereafter vented and the reaction mixture stripped, e.g., by first heating at atmospheric pressure until a temperature of about 250° C. is reached and then steam stripping at about this temperature until a product having a Ring and Ball softening point of 155° C. is obtained. After being stripped, the molten resin has a viscosity of about 400 cps. at 230° C.

Finally, 7 parts of the C₁₂–C₁₆ alkyl glycidyl ether are added to 93 parts of the molten resin and blended with it by stirring the liquid mixture while keeping it at a temperature between 175° and 220° C. The resinous product thus obtained has a Ring and Ball softening point of about 120° C. The hot melt blending is preferably done in a vessel equipped with a reflux condenser as the alkyl glycidyl ether used has a substantial vapor pressure at elevated temperatures. Blending in a substantially inert atmosphere, e.g., in the substantial absence of oxygen and moisture, is preferred when it is desired to minimize product degradation. The product is somewhat susceptible to oxidation and hydrolysis at elevated temperatures, though not unduly so.

The resulting molten blend is then preferably filtered through a fine mesh stainless steel screen to remove any foreign matter and assure a clear product, and converted to solid flake form in conventional resin flaking equipment.

Solid resin compositions thus prepared has a Ring and Ball softening point of 120° C., a hydroxyl number (as tested) between 95 and 125, e.g., 100, a specific gravity of about 1.164, an iodine number of about 140, an acid number of about 2 and a Gardner color of 11 (determined on 50% solution in toluene).

*Example 2*

A resinous composition which is liquid at room temperature is prepared in accordance with the present invention in a manner similar to that described in Example 1 except that an inert refined hydrocarbon oil is used as diluent and a larger proportion of the mixed alkyl glycidyl ether is used in the formulation. The inert hydrocarbon oil used as a diluent in this embodiment has the following properties:

| | |
|---|---|
| Specific gravity at 15.6° C. | 0.980 |
| Engler distillation: | |
| 5% off, ° C. | 200 |
| 95% off, ° C. | 275 |
| Color, Gardner, max | 4 |
| Kauri butanol value, cc. | 100+ |
| Mixed aniline point, ° C. | 18 |
| Aromatics, percent by volume | 95 |

All the other feed materials used in this embodiment are the same as those described in Example 1.

In making this liquid resin composition 80 parts of the unsaturated hydrocarbon oil fraction and 20 parts of furfuryl alcohol are heat polymerized at 220° C. and the resulting product is stripped to obtain a resin having a Ring and Ball softening point of 150° to 155° C. as in Example 1. At this point, however, 8 parts of the inert hydrocarbon diluent oil is added to the stripped resin, thereby reducing the Ring and Ball softening point of the resulting mixture to about 120° C.

Finally, 60 parts of this hydrocarbon diluted copolymer is hot melt blended at a temperature between about 125° and 175° C. with 40 parts of the C₁₂–C₁₆ alkyl glycidyl ether, stirring the mixture until a homogeneous blend is obtained. Because of the normally liquid nature of the final product the temperature in this blending step may be allowed to decrease gradually from a temperature of between about 175° to 220° C. at the beginning of this step to a substantially lower final temperature, e.g., to about 125° C. at which temperature the product will have a viscosity of between about 40 and 70 cps., e.g., 65 cps. The resulting resinous product, which is liquid at room temperature, has the following properties:

| | |
|---|---|
| Specific gravity at 25° C. | 1.045 |
| Viscosity, cps. at 25° C. | 630 |
| Gardner Color (50% solution in toluene) | 10 |
| Hydroxyl number (as tested) | 145 |
| Iodine number | 80 |

*Example 3*

The manner of use and advantages of the novel oxygen-containing resins as extenders for epoxy resin are illustrated below. The epoxy resin used in each of these tests was a conventional liquid epoxy resin made by reaction of bisphenol A and epichlorhydrin having a specific gravity of 1.16, a viscosity of 12,000 cps. at 25° C. and an epoxide equivalent of 190 (Shell "Epon 828").

In making up the various blends, in the case of the normally solid oxy-resin from Example 1 (No. 1 Resin) it is heated to its melting point and then mixed with the liquid epoxy resin and with the indicated curing agent at approximately 120° C. In the case of the normally liquid oxy-resin from Example 2 (No. 2 Resin) the indicated blends are prepared by mixing at room temperature.

The components of the various blends tested, the curing schedules used and the results obtained are shown in Tables I, II and III. Table I deals with epoxy resin blends employing a commercial modified aromatic amine (Shell "Curing Agent 2"), Table II deals with blends employing BF₃-monoethylamine as the curing agent, and Table III deals with blends employing nadic methyl anhydride as the curing agent.

TABLE I
[Epoxy-oxyresin blends aromatic amine cure]

| | Resin composition | | |
|---|---|---|---|
| | Control (100% Epoxy) | 33% Resin No. 1, 67% Epoxy | 33% Resin No. 2, 67% Epoxy | |
| Curing Agent: "Shell Z" Aromatic amine, phr.[1] | 20 | 20 | 20 | 24 |
| Curing Schedule: | | | | |
| Gel stage, hours/°C | 2/80 | 2/80 | 2/80 | 2/80 |
| Cure stage, hours/°C | 2/150 | 2/150 | 2/150 | 2/150 |
| Properties: | | | | |
| Barcol hardness, initial/10 sec | 36/36 | 34/32 | 24/21 | 31/27 |
| Heat distortion temp., °C | 140 | 120 | 70 | 85 |
| Color | Amber | Tan | Amber | Amber |
| Flexural modulus, $10^5$ p.s.i | 4.82 | 4.90 | 4.01 | 4.23 |
| Flexural strength, $10^3$ p.s.i | 19.0 | 6.0 | 19.2 | 19.4 |
| Deflection at break, inches | 0.313 | 0.070 | 0.245 | 0.400 |
| Dielectric constant, 1 kc | 4.16 | 3.70 | 3.54 | 3.52 |
| Dissipation factor, 1 kc | 0.00538 | 0.00735 | 0.00608 | 0.00616 |
| Weight loss, percent (on cure) | 0.19 | 0.23 | 0.33 | 0.13 |
| Viscosity, $10^3$ cps., catalyzed resin at 25°C | 6.9 | [2] 80 | 5.1 | 3.9 |

[1] Parts per 100 parts total resin.
[2] Estimated.

TABLE II
[Epoxy-oxyresin blends $BF_3$-monoethylamine cure]

| | Resin Composition | | |
|---|---|---|---|
| | Control (100% Epoxy) | 33% Resin No. 1, 67% Epoxy | 33% Resin No. 2, 67% Epoxy |
| Curing Agent: $BF_3$-Monoethyl-amine, phr.* | 2 | 2 | 2 |
| Curing Schedule: | | | |
| Gel stage, hours/°C | 1/120 | 1/120 | 1/120 |
| Cure stage, hours/°C | 2/150 | 2/150 | 2/150 |
| Properties: | | | |
| Barcol hardness, initial/10 sec | 35/32 | 37/34 | 28/24 |
| Heat distortion temp., °C | 165 | 145 | 85 |
| Color | Amber | Amber | Amber |
| Flexural modulus, $10^5$ p.s.i | 3.77 | 4.20 | 3.82 |
| Flexural strength, $10^3$ p.s.i | 16.0 | 18.0 | 17.5 |
| Flexural deflection, inches | 0.577 | 0.240 | 0.370 |
| Weight loss, percent (on cure) | 0.45 | 0.42 | 0.64 |

*Parts per 100 parts total resin.

Table I shows that the normally liquid Resin No. 2 is a more advantageous epoxy resin extender than Resin No. 1 in the particular system used when maximum flexural strength and a low working viscosity are desired. On the other hand, Resin No. 1 gives a product having a higher distortion temperature and a higher hardness than Resin No. 2. The last two tests in this table show that both hardness and heat distortion temperature can be significantly increased by a relatively minor increase in concentration of the curing agent in this system.

Table II shows that with the $BF_3$-monoethylamine curing agent the normally solid Resin No. 1 gives not only a harder and more heat resistant product but, surprisingly, also a product with the higher flexural strength than does Resin No. 2. A comparison of these results with those of Table I shows that the choice of a proper curing system provides another useful variable permitting the formulator to make a product having the best combination of properties for any particular use.

Table III illustrates the properties obtained with epoxy-oxyresin blends using nadic methyl anhydride (methyl-4-endomethylene tetrahydrophthalic anhydride) as the curing agent. It is interesting to note that the heat distortion temperature of the products in this system goes through a maximum as the proportion of the oxyresin in the blend is increased and that all three blends containing Resin No. 1 had significantly higher heat distortion temperatures than the straight epoxy control. Furthermore, the weight loss in each of these blends was substantially lower than the weight loss of the control. While the color of the

TABLE III
[Epoxy-oxyresin blends nadic methyl anhydride cure]

| | Resin Composition | | | | | |
|---|---|---|---|---|---|---|
| | Control (100% Epoxy) | 20% Resin No. 1, 80% Epoxy | 33% Resin No. 1, 67% Epoxy | 50% Resin No. 1, 50% Epoxy | 33% Resin No. 2, 67% Epoxy | 33% Resin No. 2, 67% Epoxy |
| Cure System: | | | | | | |
| Nadic methyl anhydride, phr.* | 91.0 | 91.0 | 91.0 | 91.0 | 91.0 | 109.0 |
| Benzyl dimethyl amine, (accelerator) phr.* | 0.6 | 0.6 | 0.6 | 0.6 | 0.6 | 0.7 |
| Cure Schedule: | | | | | | |
| Gel stage, hrs./°C | 4/120 | 4/120 | 4/120 | 4/120 | 4/120 | 4/120 |
| Cure stage, hrs./°C | 4/150+4/205+16/250 | 4/150+4/205+16/250 | 4/150+4/205+16/250 | 4/150+4/205+16/250 | 4/150+4/205+16/250 | 4/150+4/205+16/250 |
| Properties: | | | | | | |
| Barcol hardness, initial/10 sec | 45/43 | 44/41 | 44/42 | 45/42 | 37/34 | 39/36 |
| Heat distortion temp., °C | 172 | 180 | 190 | 180 | 117 | 133 |
| Flexural modulus, $10^5$ p.s.i | 4.95 | 4.50 | 4.60 | 4.50 | 4.34 | 3.84 |
| Flexural strength, $10^3$ p.s.i | 18.5 | 12.5 | 16.0 | 13.5 | 18.6 | 16.1 |
| Weight loss, percent (on cure) | 4.2 | 1.1 | 0.72 | 0.93 | 3.1 | 3.3 |
| Dielectric constant, 1 kc | 3.31 | 3.18 | 3.15 | 3.10 | 3.12 | 3.08 |
| Dissipation factor, 1 kc | 0.00804 | 0.00680 | 0.00480 | 0.00380 | 0.00314 | 0.00343 |

*Parts per 100 parts total resin.

products in this series of tests were relatively dark, lighter colors can be obtained by using milder curing conditions.

The results obtained indicate that the novel oxyresins are useful as extenders in almost all epoxy applications ranging from fluid bed coatings to filament winding processes, road paving compositions, glass fiber reinforced epoxy resin molding compounds and so forth.

It will be understood, of course, that other variations and modifications not specifically described herein are possible without departing from the scope or the spirit

What is claimed is:

1. A resinous composition which comprises a homogeneous blend of 100 parts of a copolymer made by copolymerization of about 15 to 60 percent by weight of furfuryl alcohol and correspondingly about 85 to 40 percent by weight of a $C_8$–$C_{12}$ unsaturated cyclic olefin hydrocarbon material copolymerizable therewith having a boiling range such that at least 95% of the material boils above about 140° and below about 250° C., a specific gravity (15.6°/15.6° C.) between about 0.89 and 0.985, an iodine number in excess of about 135 and a mixed aniline point below about 60° C.; and 5 to 50 parts of an aklyl glycidyl ether containing an alkyl group of 4 to about 18 carbon atoms.

2. A composition according to claim 1 wherein the unsaturated olefin comprises indene.

3. A composition according to claim 1 wherein the olefin comprises dicyclopentadiene.

4. A composition according to claim 1 wherein the olefin comprises styrene.

5. A composition according to claim 1 wherein the olefin material is supplied to the copolymerization as a mixture of compounds obtained by thermally cracking a petroleum hydrocarbon fraction, said mixture containing between about 35% and 90% of polymerizable $C_8$–$C_{12}$ unsaturated hydrocarbons having a specific gravity between about 0.950 and 0.985.

6. A composition according to claim 5 which further comprises about 5 to 50 parts of a normally liquid inert hydrocarbon oil which boils above about 200° C., said composition having a Ring and Ball softening point in the range between about 5° C. and 150° C.

7. A process for making an oxygen-containing copolymer which comprises mixing 10 parts of furfuryl alcohol and about 15 to 100 parts of a $C_8$–$C_{12}$ unsaturated olefinic hydrocarbon copolymerizable therewith boiling essentially between about 140° and about 250° C. and having a specific gravity (15.6°/15.6° C.) between about 0.89 and 0.985, an iodine number above about 135 and a mixed aniline point below about 60° C., heating the reaction mixture at a temperature between about 150° and 230° C. in a closed reaction zone for a time sufficient to effect copolymerization, and adding to the resulting polymerized product an alkyl glycidyl ether having from 4 to 18 carbon atoms per molecule in a proportion of about 5 to 100 parts per 100 parts of the copolymer.

8. A process for making an epoxide-containing copolymer resin which comprises mixing 10 parts of furfuryl alcohol and about 30 to 50 parts of a thermally cracked petroleum fraction containing about 35 to 90 percent of polymerizable unsaturated $C_8$–$C_{10}$ cyclic hydrocarbons boiling essentially between about 140° and about 250° C. and having a specific gravity (15.6°/15.6° C.) between about 0.89 and 0.985, an iodine number above about 135 and a mixed aniline point below about 60° C., heating the resulting mixture in the substantial absence of moisture at a temperature between about 150° and 230° C. until a copolymer yield of at least about 50% based on total charge is obtained, stripping unpolymerized compounds from the mixture, and blending the remaining copolymer with an alkyl glycidyl ether having about 12 to 16 carbon atoms per molecule in a proportion of about 5 to 70 parts of the glycidyl ether per 100 parts of the copolymer.

9. A resin making process according to claim 8 wherein about 5 to 12 parts of the alkyl glycidyl ether is mixed with 100 parts of the copolymer.

10. An epoxide-containing copolymer resin made by the process of claim 9 and having a Ring and Ball softening point between about 100° and 150° C.

11. A resin making process according to claim 8 wherein about 50 to 70 parts of the alkyl glycidyl ether is mixed with 100 parts of the copolymer.

12. A resin making process according to claim 11 which comprises the further step of adding to the stripped copolymer about 5 to 20 parts of an inert hydrocarbon oil which boils within the range between about 350° and about 560° F. and has a Kauri Butanol value greater than 95 cc.

13. An epoxide-containing copolymer resin made by the process of claim 12.

14. A curable epoxy resin blend which comprises (1) 100 parts of an epoxy resin having an epoxide equivalent of between about 150 and 1000 and (2) about 5 to 100 parts of the copolymer resin of claim 8.

15. A curable epoxy resin blend which comprises (1) 100 parts of an epoxy resin having an epoxide equivalent between about 150 and 1000 and (2) about 5 to 50 parts of the copolymer resin of claim 13.

16. A curable epoxy resin blend according to claim 15 which further comprises a minor amount of nadic methyl anhydride as a curing agent therefor.

17. A curable epoxy resin blend which comprises (1) 100 parts of an epoxy resin having an epoxide equivalent of between about 180 and 200, (2) about 20 to 100 parts of the copolymer resin of claim 10, and (3) about 1 to 5 percent of $BF_3$-monoethylamine based on the combined weight of the epoxy resin and the copolymer resin as a curing agent therefor.

References Cited

UNITED STATES PATENTS 3,301,918   1/1967   Dereich.

OTHER REFERENCES

Product Information, Procter and Gamble, Inc., Cincinnati, Ohio (1963): "Procter and Gamble Epoxides," Procter and Gamble Epoxide No. 7 as Reactive Diluent in Epoxy Resins.

MORRIS LIEBMAN, *Primary Examiner.*

JOHN CALLAGHAN, *Assistant Examiner.*